US012235699B2

(12) United States Patent
Dibbad et al.

(10) Patent No.: US 12,235,699 B2
(45) Date of Patent: Feb. 25, 2025

(54) ENERGY EFFICIENT VMIN ARCHITECTURE FOR SHARED POWER RAILS

(71) Applicant: QUALCOMM Incorporated, San Diego, CA (US)

(72) Inventors: Vijayakumar Ashok Dibbad, Bangalore (IN); Nikhil Ashok Bhelave, Gondiya (IN); Jeffrey Gemar, San Diego, CA (US); Matthew Severson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/166,381

(22) Filed: Feb. 8, 2023

(65) Prior Publication Data

US 2024/0264651 A1    Aug. 8, 2024

(51) Int. Cl.
*G06F 1/30* (2006.01)
(52) U.S. Cl.
CPC ..................................... *G06F 1/305* (2013.01)
(58) Field of Classification Search
CPC ........................................................ G06F 1/305
See application file for complete search history.

(56) References Cited

U.S. PATENT DOCUMENTS

| 5,945,817 A * | 8/1999 | Nguyen ................... G06F 1/305 |
| | | 323/273 |
| 2002/0125871 A1 | 9/2002 | Groom et al. |

| 2015/0229303 A1 * | 8/2015 | Li .......................... H03K 17/145 |
| | | 307/130 |
| 2016/0291660 A1 * | 10/2016 | Chueh ....................... G06F 1/263 |
| 2017/0030954 A1 | 2/2017 | Whatmough et al. |
| 2017/0110958 A1 | 4/2017 | Wang et al. |
| 2017/0329391 A1 * | 11/2017 | Jaffari ......................... G06F 1/28 |
| 2018/0284879 A1 | 10/2018 | Gorbatov et al. |
| 2019/0041942 A1 * | 2/2019 | Keceli ..................... G06F 1/3206 |

(Continued)

OTHER PUBLICATIONS

Heikkila, Tuomas, "Everything You Need to Know About Impedance", Altium.com, retrieved from the Internet on May 22, 24 at <https://resources.altium.com/p/know-impedance> (Year: 2023).*

(Continued)

*Primary Examiner* — Faisal M Zaman
(74) *Attorney, Agent, or Firm* — Muncy, Geissler, Olds & Lowe, P.C./QUALCOMM

(57) ABSTRACT

Various embodiments include methods performed by a processor for managing voltage droop margins of a power distribution network (PDN). Various embodiments may include receiving, by a processor from a first client powered by a shared power rail within the PDN, a first requested performance corner, receiving, by the processor from a second client powered by the shared power rail, a second requested performance corner, determining by the processor a first peak current value based on the first requested performance corner, determining by the processor a second peak current value based on the second requested performance corner, determining by the processor a system voltage droop margin based on the first peak current value, the second peak current value, and an impedance value of the PDN, and adjusting a voltage of the shared power rail based on the system voltage droop margin.

27 Claims, 11 Drawing Sheets

(56) References Cited

U.S. PATENT DOCUMENTS

| | | | |
|---|---|---|---|
| 2019/0064896 A1* | 2/2019 | Das | H04L 12/10 |
| 2019/0089244 A1* | 3/2019 | Koski | H02M 3/07 |
| 2019/0146568 A1* | 5/2019 | Bose | G06F 1/305 |
| | | | 713/340 |
| 2019/0146569 A1* | 5/2019 | Nge | G06F 1/305 |
| | | | 713/320 |
| 2020/0204067 A1 | 6/2020 | Dabral et al. | |
| 2020/0272220 A1* | 8/2020 | Mosalikanti | H03K 19/20 |
| 2022/0179473 A1 | 6/2022 | Ranel et al. | |
| 2023/0229222 A1* | 7/2023 | Uan-Zo-Li | G06F 1/305 |
| | | | 713/300 |

OTHER PUBLICATIONS

International Search Report and Written Opinion—PCT/US2023/083565—ISA/EPO—Apr. 22, 2024. 16 pages.

\* cited by examiner

| Shared Rail | Request Performance Corner | Aggregated Rail Corner Voltage | Each Client's Ipeak at aggregated performance corner | Each Client's Ipeak at requested performance corners |
|---|---|---|---|---|
| Client 1 | Turbo (high frequency) | Turbo | 10A (Turbo V and Freq) | 10A (Turbo V and Freq) |
| Client 2 | SVS (mid/low frequency) | | 6A (Turbo V and Freq) | 2A (Turbo V and SVS Freq) |
| Client 3 | LSVS (lower/lowest frequency) | | 5A (Turbo V and Freq) | 1A (Turbo V and LSVS Freq) |
| | | Total di/dt: | 21A | 13A |

FIG. 6

ENERGY EFFICIENT VMIN ARCHITECTURE FOR SHARED POWER RAILS

BACKGROUND

Power managers, or power management integrated circuits (PMICs) are used for managing the power requirements of host systems. A power manager may manage a rail voltage provided to a system-on-a-chip (SoC). The rail voltage may be provided to clients (e.g., processors, loads) of the SoC so that the clients may operate. The clients may request, from the power manager, voltage changes to the shared power rail voltage to accommodate various performance modes during which the clients may perform functions at higher operational frequencies. Voltage drooping may occur during various processes and during transitions between performance modes. The power managers may output voltage on the shared power rail to accommodate for any voltage drooping, such that the clients receive sufficient voltage during any voltage drooping event.

SUMMARY

Various aspects include methods executable by a processor of a computing device for managing a power distribution network (PDN). Various aspects may include determining by the processor a first peak current value based on a first requested performance corner received from a first client powered by a shared power rail within the PDN; determining by the processor a second peak current value based on a second requested performance corner received from a second client powered by the shared power rail; determining by the processor a system voltage droop margin based on the first peak current value, the second peak current value, and an impedance value of the PDN; and adjusting a voltage of the shared power rail based on the system voltage droop margin.

In some aspects, determining by the processor the first peak current value based on the first requested performance corner may include the processor identifying the first peak current value associated with the first requested performance corner in a lookup table, and determining by the processor the second peak current value based on the second requested performance corner may include the processor identifying the second peak current value associated with the second requested performance corner in the lookup table.

In some aspects, determining by the processor the system voltage droop margin based on the first peak current value, the second peak current value, and the impedance value of the PDN may include: aggregating the first peak current value and the second peak current value to determine by the processor a cumulative peak current value, and determining by the processor the system voltage droop margin based on the cumulative peak current value and the impedance value of the PDN.

In some aspects, the impedance value of the PDN may be based on a highest operating frequency that may be equal to a higher of a first operating frequency of the first requested performance corner and a second operating frequency of the second requested performance corner.

Some aspects may further include determining by the processor a first impedance value associated with the first requested performance corner, in which the first impedance value may be associated with a first operating frequency of the first requested performance corner; and determining by the processor a second impedance value associated with the second requested performance corner, in which the second impedance value may be associated with a second operating frequency of the second requested performance corner.

In some aspects, determining by the processor the system voltage droop margin based on the first peak current value, the second peak current value, and the impedance value of the PDN may include: determining by the processor a first voltage droop margin based on the first peak current value and the first impedance value; determining by the processor a second voltage droop margin based on the second peak current value and the second impedance value; and aggregating the first voltage droop margin and the second voltage droop margin to determine by the processor the system voltage droop margin.

Some aspects may further include reducing the system voltage droop margin based on transient load current rise time of the PDN.

In some aspects, the first requested performance corner may be included as part of a first vote request received by the processor from the first client, and the second requested performance corner may be included as part of a second vote request received by the processor from the second client.

In some aspects, the first requested performance corner and the second requested performance corner may be one of a high frequency mode, a low frequency mode, or a lowest frequency mode.

Further aspects include a computing device (e.g., a UE) including a processor configured to perform operations of any of the methods summarized above. Further aspects include a computing device including means for performing functions of any of the methods summarized above. Further aspects include a non-transitory processor-readable medium having stored thereon processor-executable instructions configured to cause a processor of a UE to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

FIG. 6 illustrates an example peak current value table for client voting schemes of a PDN.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices implementing such methods for managing voltage droop margins of a power distribution network (PDN) of a computing device. Some embodiments include reducing voltage margins of the voltage output from a power manager/power management integrated circuit to a shared voltage rail that powers multiple clients (e.g., processors, processing units, loads (etc.). Some embodiments reduce voltage margins and thereby conserve power by determining voltage droop margins based on performance corners requested by each client on the shared power rail.

The terms "computing device" and "mobile device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Figure 1:
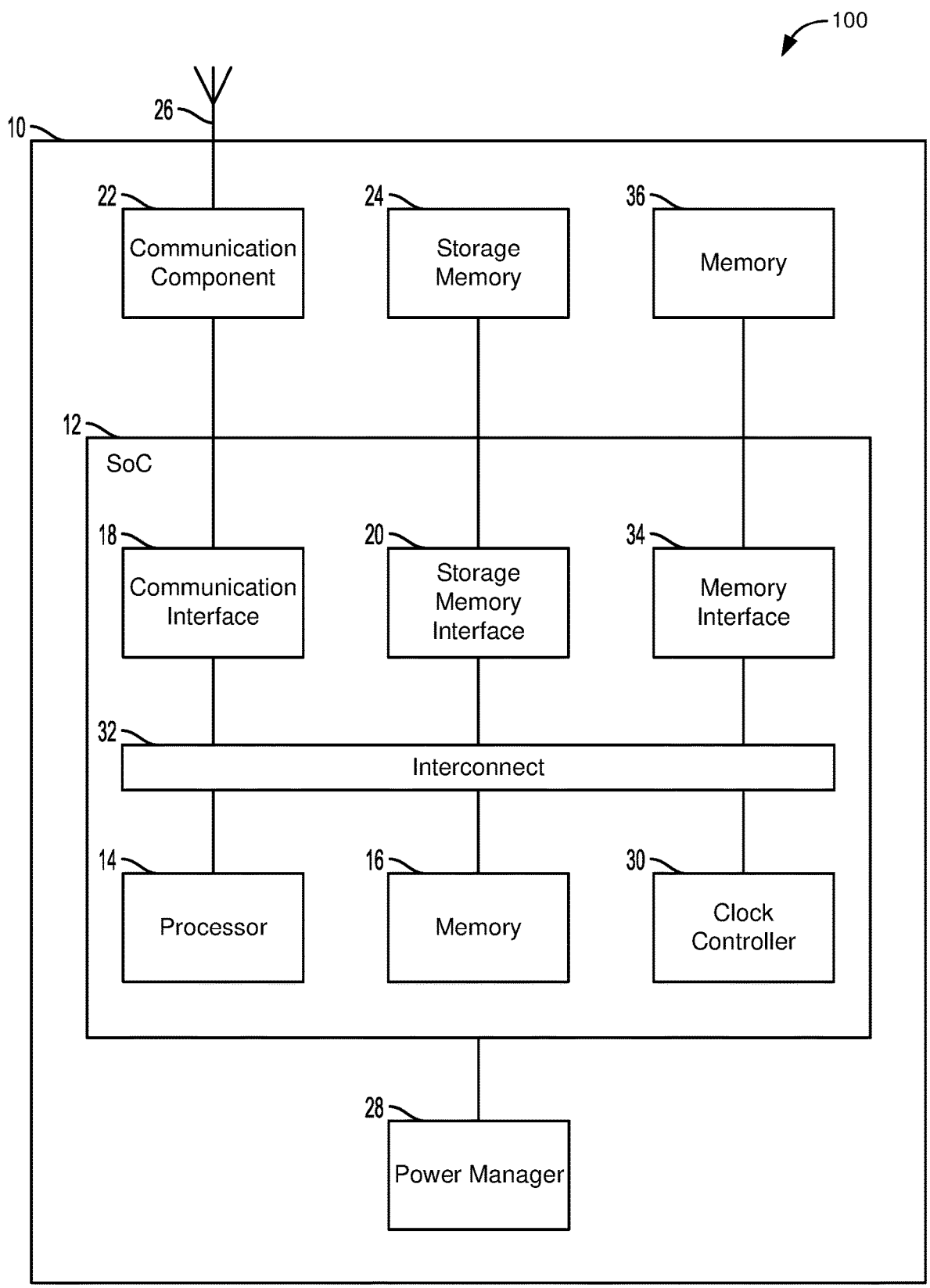
FIG. 1 is a component block diagram illustrating an example computing device suitable for implementing various embodiments.

FIG. 1 illustrates a system 100 including a computing device 10 suitable for use with various embodiments. The computing device 10 may include a system-on-chip (SoC) 12 with a processor 14, a memory 16, a memory interface 34, a communication interface 18, a storage memory interface 20, a clock controller 30, and an interconnect 32. The computing device 10 may further include a communication component 22, such as a wired or wireless modem, a storage memory 24, an antenna 26 for establishing a wireless communication link, a power manager 28, and a memory 36. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), neural network processing unit (NPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The computing device 10 may include any number and combination of memories, such as the memory 16 integral to the SoC 12 and the memory 36 separate from the SoC 12. Any of the memories 16, 36 may be a volatile or non-volatile memory configured for storing data and processor-executable code for access by the processor 14. The computing device 10 and/or SoC 12 may include one or more memories 16, 36 configured for various purposes. One or more memories 16, 36 may include volatile memories such as random-access memory (RAM) or main memory, including static RAM (SRAM), such as the memory 16, dynamic RAM (DRAM), such as the memory 36, or cache memory.

The memories 16, 36 may be configured to temporarily store a limited amount of data received from a data sensor or subsystem, data and/or processor-executable code instructions that are requested from a non-volatile memory 16, 24, 36 loaded to the memories 16, 36 from the non-volatile memory 16, 24, 36 in anticipation of future access based on a variety of factors, and/or intermediary processing data and/or processor-executable code instructions produced by the processor 14 and temporarily stored for future quick access without being stored in non-volatile memory 16, 24, 36. The memory 16, 36 may be configured to store data and processor-executable code in parts of the memory 16, 36 configured to store data and processor-executable code for secure computing operations, referred to herein as a secure portion. The memory 16, 36 may be configured to store data and processor-executable code in parts of the memory 16, 36 configured to store data and processor-executable code for non-secure computing operations, referred to herein as a non-secure portion.

The memory interface 34 may work in unison with the memory 36 to enable the computing device 10 to store and retrieve data and processor-executable code on and from the memory 36. The memory interface 34 may control access to the storage memory 36 and allow the processor 14 to read data from and write data to the memory 36.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

The power manager 28 may be configured to control power states of one or more power rails (not shown) for power delivery to the components of the SoC 12. In some embodiments, the power manager 28 may be configured to generate notification signals indicating power states and/or power events of the power rails to the components of the SoC 12 to prompt the components of the SoC 12 to respond to the signaled power states and/or events. For example, the notification signals generated and sent by the power manager 28 may be configured as an interrupt signal associated with a power state and/or a power event of the power rails, such as a power state and/or a power event associated with voltage droop margins based on requested performance corners of components powered by a shared power rail. In some embodiments, the power manager 28 may be configured to control amounts of power provided to the components of the SoC 12. For example, the power manager 28 may be configured to control connections between components of the SoC 12 and the power rails. As another example, the power manager 28 may be configured to control amounts of power on the power rails connected to the components of the SoC 12. As a further example, the power manager 28, or a processor coupled to the power manager 28, may be configured to calculate voltage droop margins based on PDN impedance and peak current for each performance corner requested by each component on a shared power rail, and may supply voltage to the shared power rail based on the calculated voltage droop margins.

A clock controller 30 may be configured to control clock signals transmitted to the components of the SoC 12. In some embodiments, the clock controller 30 may be configured to signal clock states, such as gated or ungated, to components of the SoC 12 to prompt the components of the SoC 12 to transition to the clock state. For example, a component of the SoC 12 may transition to a gated clock state in response to receiving a gated clock state signal from the clock controller 30 by disconnecting from a clock signal and may transition to an ungated clock state in response to receiving an ungated clock state signal from the clock controller 30 by connecting to the clock signal. In some embodiments, the clock controller 30 may be configured to control clock signals to components of the SoC 12. For example, the clock controller 30 may disconnect a component of the SoC 12 from a clock signal to transition the component of the SoC 12 to a gated clock state and may connect the component of the SoC 12 to the clock signal to transition the component of the SoC 12 to an ungated clock state.

The interconnect 32 may be a communication fabric, such as a communication or interface bus, configured to communicatively connect the components of the SoC 12. The interconnect 32 may transmit signals between the components of the SoC 12. In some embodiments, the interconnect 32 may be configured to control signals between the components of the SoC 12 by controlling timing and/or transmission paths of the signals.

Some or all of the components of the computing device 10 and/or the SoC 12 may be arranged differently and/or combined while still serving the functions of the various embodiments. The computing device 10 may not be limited to one of each of the components, and multiple instances of each component may be included in various configurations of the computing device 10.

Figure 2:
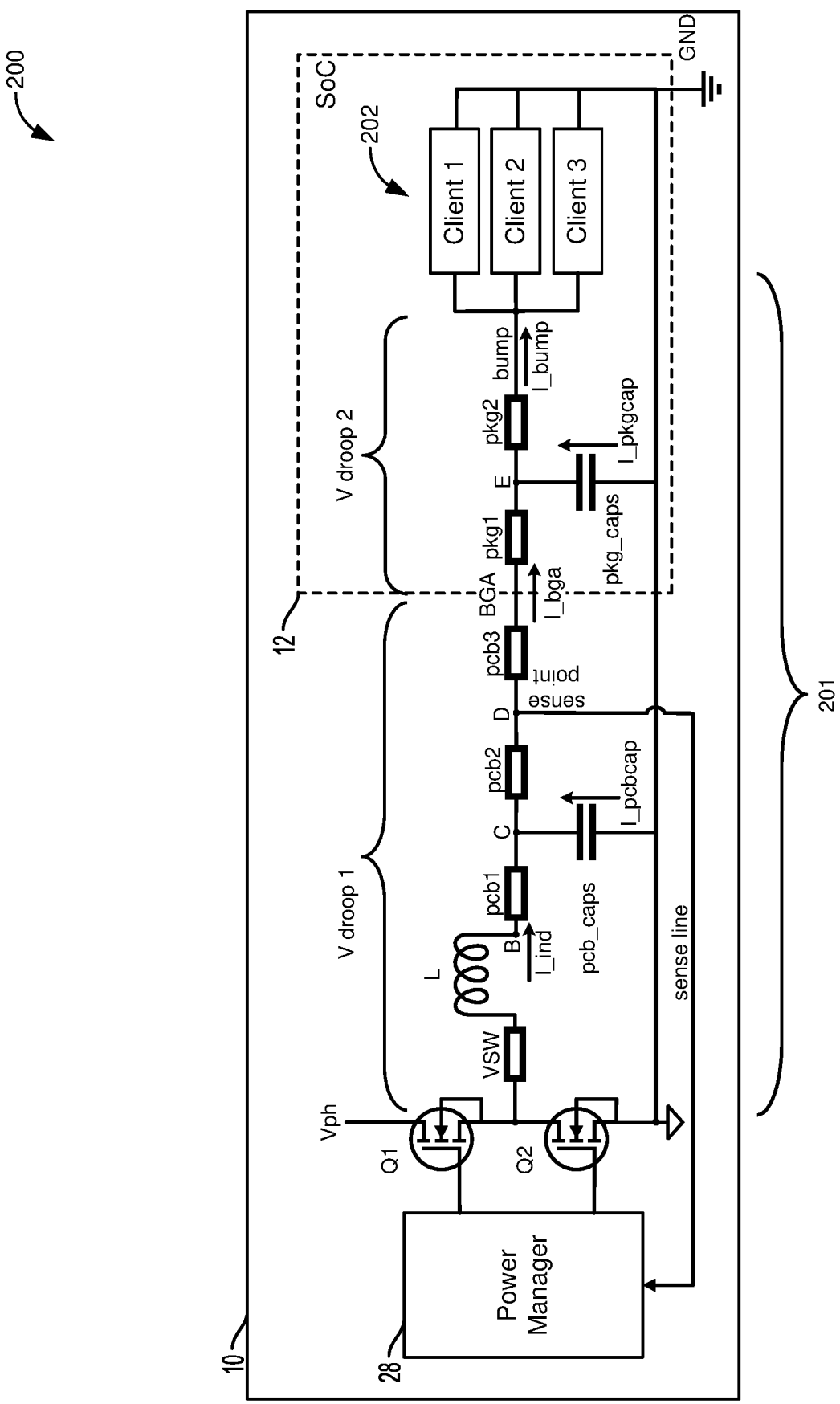
FIG. 2 illustrates a system including a computing device suitable for use with various embodiments.

FIG. 2 illustrates a system 200 including the computing device 10 suitable for use with various embodiments. FIG. 2 illustrates a shared rail scheme in which a single source provides power to multiple clients, Referring to FIGS. 1-2, the computing device 10 may include the power manager 28, a shared power rail 201 (e.g., core logic power rail (CX), embedded memory power rail (MX), (not shown)), and clients 202 (i.e., Client 1, Client 2, Client 3). The power manager 28 may control the power supplied across the shared power rail 201. The clients 202 may be connected to the shared power rail 201 and may therefore be supplied with power levels managed by the power manager 28.

The clients 202 may be any type of load component or device requiring power to function that is capable of communicating with the power manager 28 (i.e., requesting a performance corner, providing a voltage voting message for adjusting the power supplied to the shared power rail 201, etc.), such as processors, subprocessors, cores, or other ICs. For example, the clients 202 may be processors (e.g., processor 14) or processor cores of the SoC 12 as illustrated. As another example, the clients 202 may be components located outside of the SoC 12, such as other board level components communicably coupled to the SoC 12. As a further example, the clients 202 may be located externally from but communicably connected to the computing device 10. The clients 202 are illustrated as having a first client Client 1, a second client Client 2, and a third client Client 3. However, the clients 202 may not be limited to three clients, and may include fewer or more clients connected to the shared power rail 201 implemented in various configurations of the system 200.

In some embodiments, the power manager 28 may be configured as a power management integrated circuit (PMIC). For example, the power manager 28 may be a PMIC in communication with a resource manager, and the PMIC may send a request message to the resource manager requesting approval to adjust the voltage across the shared power rail 201, in which the request message is based on and/or includes requested performance corners of the clients 202. The resource manager may transmit a response message to the PMIC approving or denying the request to adjust the voltage across the shared power rail. Upon receiving approval from the resource manager, the PMIC may adjust the voltage across the shared power rail 201 and transmit an acknowledge (ACK) message to the resource manager indicating that the voltage adjustment has been performed. The clients 202 may then be configured according to the requested performance corners.

The shared power rail 201 may include any number of components positioned between the power manager 28 and the clients 202 for providing power to the clients 202, and is not limited to the components illustrated in the example circuitry of the system 200. The components of the shared power rail 201 may include any number and any type of components suitable for supplying power to the clients 202, depending on a device type of the clients 202 and the expected load of the clients 202. For example, the clients 202 may be processors or processor cores located within the SoC 12, the power manager 28 may be located on a same printed circuit board (PCB) as the SoC 12, and the shared power rail 201 may include any active and passive components along the power supply path and the ground return path between the power manager 28 and the clients 202. The shared power rail 201 may therefore include any components along the path routed on and/or within the PCB and within the package of the SoC 12. For example, the shared power rail 201 may include PCB level components, such as transistors (Q1, Q2) for passing a supply voltage (e.g., Vph) into the shared power rail 201 components, a voltage controller switch (VSW), an inductor (L), PCB level resistors (pcb1, pcb2, pcb3) (or resistance values for wiring), and capacitors (pcb_caps), and components on the SoC 12 package level between the ball grid array (BGA) connected to the PCB and the clients 202 (i.e., connected at solder bumps ("bump"), such as package resistors (pkg1, pkg2) and package capacitors (pkg_caps).

A sense line may be coupled to a point along the shared power rail 201 pathway, such as the sense point D. The sense line may be connected to the power manager 28, such that the power manager 28 may observe power values and changes after the supply voltage Vph has been passed through a portion of the components of the shared power rail 201. The power manager 28 may make adjustments (e.g., voltage microadjustments) to the voltage supplied to the shared power rail 201 based on the power values observed at sense point D. The power manager 28 may have any number of additional sense points along the shared power rail 201, and is not limited to a single sense point as illustrated.

The shared voltage rail 201 may exhibit voltage drooping due to various frequency-based/frequency-affected components (L, pcb_caps, pkg_caps, etc.) along the shared voltage rail 201. For example, the voltage supplied along the shared power rail 201 may experience voltage drooping (V droop 1) due to PCB-level transient response(s) (i.e., transient responses of the power manager 28 and the PCB-level capacitors (pcb_caps)), and voltage drooping (V droop 2) due to package & on die level transient response(s) (i.e., transient responses of the clients 202 and package & on die level capacitance (pkg_caps)).

Figure 3A:
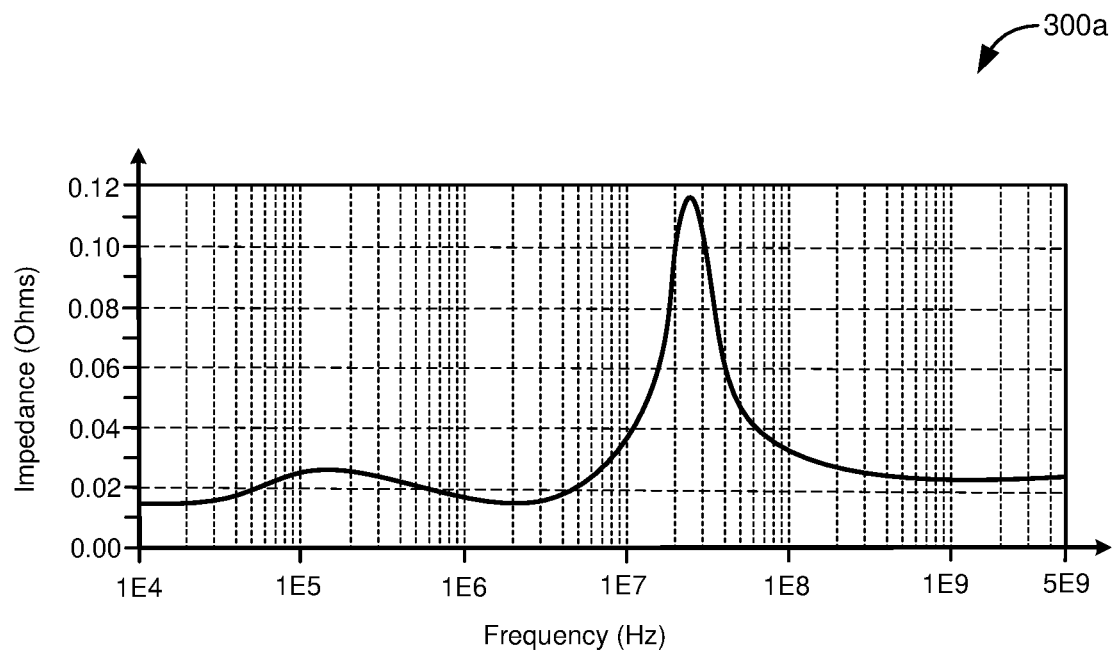
FIG. 3A illustrates a graph representing impedance values within a power distribution network (PDN) as a function of frequency according to some embodiments.
Figure 3B:
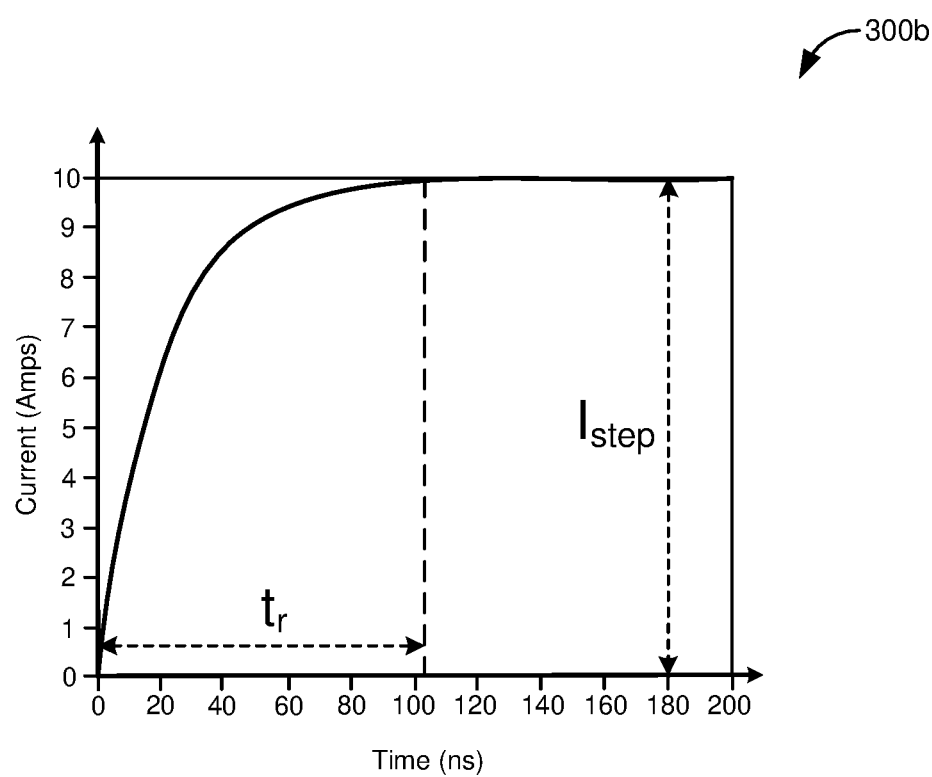
FIG. 3B illustrates a graph representing current values within a PDN as a function of time according to some embodiments.

FIGS. 3A and 3B illustrate graphs representing example PDN impedance values and transient load current values that may be measured within some embodiments. FIG. 3A illustrates a graph representing impedance values within a PDN as a function of frequency according to some embodiments. FIG. 3B illustrates a graph representing current values within a PDN as a function of time according to some embodiments. The examples in FIGS. 3A and 3B are for illustrative purposes and do not represent the entirety of potential circumstances and responses for the impedance and current values measurable or experienced within a PDN, and does not limit the scope of the claims and specification to this example. Other descriptions of circumstances and responses for impedance and current for a shared power rail may be similarly charted.

Referring to FIGS. 1-3B, voltage droops (e.g., V droop 1, V droop 2) are the result of impedance as a function of frequency multiplied by the transient load current (e.g., V droop=Z(f)*di/dt). For any given PDN circuit design, the impedance values are fixed along a path of the shared power rail (e.g., 201). For example, as illustrated in FIG. 3A, the magnitude of the impedance (Ohms) may be fixed, or static, for the shared power rail 201 of the system 200 as a function of frequency (Hz), in which the impedance is a certain value depending on the phase of the voltage provided to the shared power rail 201 by the power manager 28. For any given PDN circuit design, current values, namely the transient current magnitude ($I_{step}$) and step load bandwidth (i.e., rise time of dynamic load ($t_r$)) are dynamic and dependent upon use case activity (voltage voting by clients 202 for requesting more/less voltage and/or faster/slower operating modes). For example, the transient current magnitude (Amps) and step load bandwidth (time) may vary depending on whether one or more loads of the clients 202 requests a change in a performance corner (i.e., change in voltage and/or phase) from the power manager 28.

Figure 4:
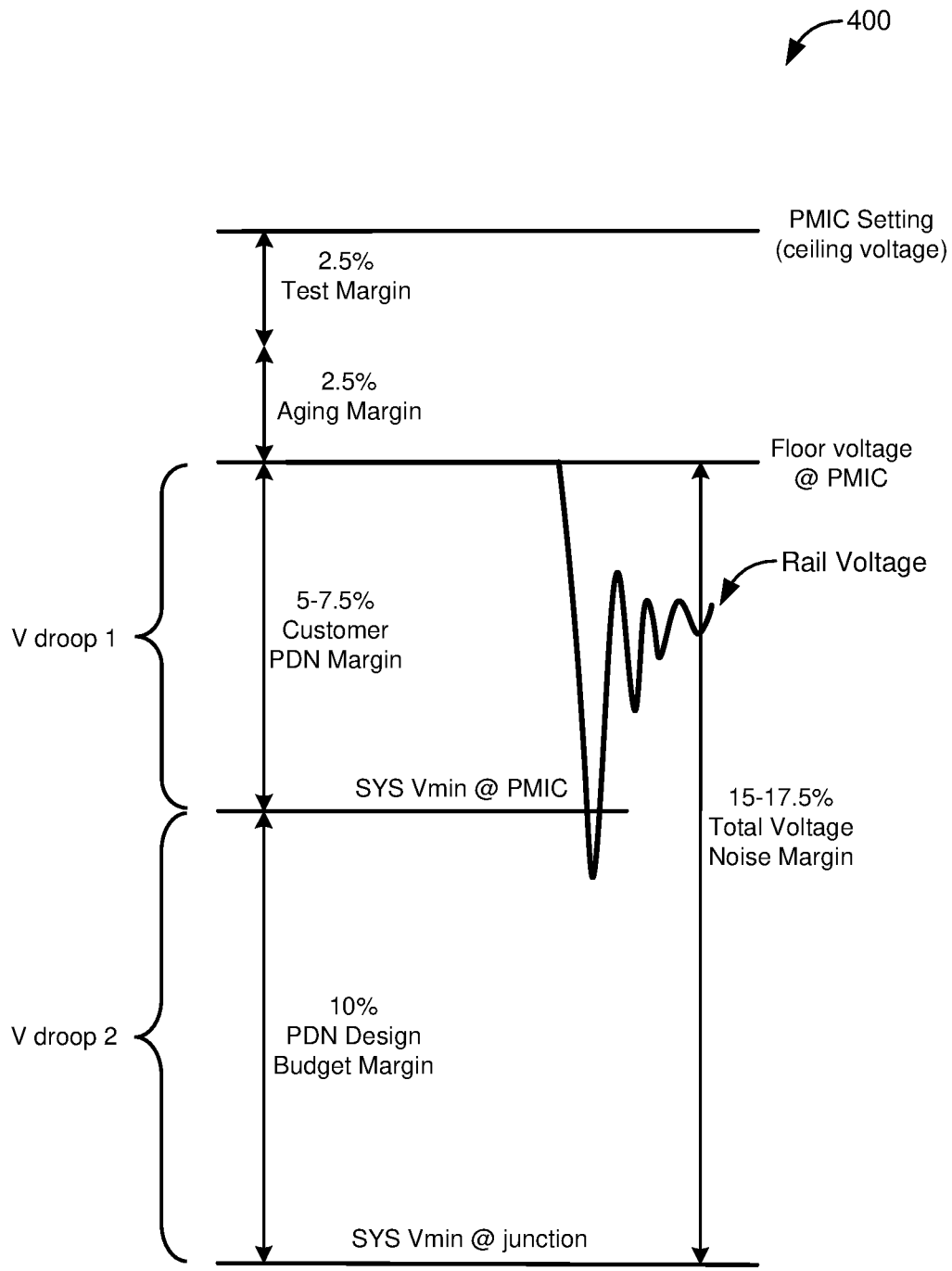
FIG. 4 illustrates a diagram 400 including voltage margins for a shared power rail within a PDN.

FIG. 4 illustrates a diagram 400 including voltage margins for a shared power rail within a PDN. Absolute percentage of these voltage margins may vary based on system design and may be different than the percentages illustrated. For example, percentages may vary but may generally follow an overall breakup of voltage margins as shown. The diagram 400 illustrates conventional voltage margins that are designed into the power output settings of a PMIC (PMIC setting), such that the voltage level provided to loads at the endpoints of a shared power rail does not drop below a minimum system load requirement (i.e., SYS Vmin @ junction) as a result of voltage drooping due to transient responses of the components of the shared power rail. In other words, the conventional voltage margins illustrated add a voltage buffer, or voltage margin, to ensure the actual client-side voltage remains above a client-side voltage requirement throughout any process of making power adjustments to the shared power rail. The percentage of each voltage margin may be a percentage of the (i.e., SYS Vmin @ junction).

Applying the concepts of the diagram 400 to the system 200, a PMIC setting (e.g., power manager 28 setting) may be offset from the SYS Vmin @ junction voltage value (e.g., voltage at clients 202) by a number of voltage margins. The percentages of the voltage margins are merely illustrative and not meant to be exhaustive, and may vary depending on at least the client load and shared power rail circuit design.

The voltage margins may include dynamic margins such as test margins, aging margins, power manager/PMIC direct current (DC) margins, and any other margins to account for manufacturing process discrepancies, PCB and component aging, and ambient, board-level, and internal-IC temperatures. For example, process corner voltage margins may be determined using automated test equipment (ATE), providing open-loop core power reduction margins. As another example, aging voltage margins may be dynamically adjusted in situ. As a further example, voltage microadjustments may be dynamically adjusted for temperature changes in a closed-loop core power reduction methodology.

The voltage margins may include static, non-dynamic margins that may be designed to accommodate worst case scenario voltage droops. For example, a customer PDN margin may be a static voltage droop margin that may be designed to account for voltage droop (e.g., V droop 1) for PMIC (e.g., power manager 28) and PCB capacitor (e.g., pcb_caps) transient responses. The customer PDN margin may be a percentage margin above the SYS Vmin @ PMIC (e.g., the voltage value measured by the power manager 28 at the sense point D via the sense line). As another example, a PDN design budget margin may be a static voltage droop margin that may be designed to account for voltage droop (e.g., V droop 2) for package & on-die (e.g., SoC 12) capacitance (e.g., pkg_caps) transient responses, other package and on-die voltage drops, and package and die PDN noise margins. The PDN design budget margin may be a percentage margin above the SYS Vmin @ junction (e.g., voltage at clients 202).

The static customer PDN margin and PDN design budget margin may be combined and/or referred to as a total Vmin noise margin, in which the source (e.g., PMIC) voltage is a certain percentage above or the SYS Vmin @ junction. The total Vmin noise margin may be a worst-case voltage margin to account for concurrent peak current values from all loads (e.g., clients 202) on the shared power rail (e.g., 201). In other words, the total Vmin noise margin may account for worst-case voltage droops such that when the loads (e.g., clients 202) are operating at maximum capability (e.g., high frequency operations) simultaneously, the load voltage (i.e., voltage observed/measured at the clients 202) still exceeds a minimum operating voltage of the loads at the lowest point of PCB-side and/or package-side voltage droop(s).

By designing for worst-case voltage droops with static total Voltage margins, conventional PMIC settings often provide more voltage to a shared power rail than necessary, as loads are not always operating at the highest capability. For example, a sample Rail Voltage signal having a voltage level set to the "floor voltage @ PMIC" is illustrated as experiencing voltage drooping that extends below the SYS Vmin @ PMIC threshold. However, the total margin overcompensates for the worst-case voltage drooping, and much of the provided voltage margin beneath the Rail Voltage remains unutilized. Various embodiments optimize and reduce the static PDN margins (customer PDN margin for V droop 1, PDN design budget margin for V droop 2) and lower the floor voltage of the power manager 28 settings by determining an actual worst case voltage droop based on requested performance corners of each of the clients 202.

Figure 5:
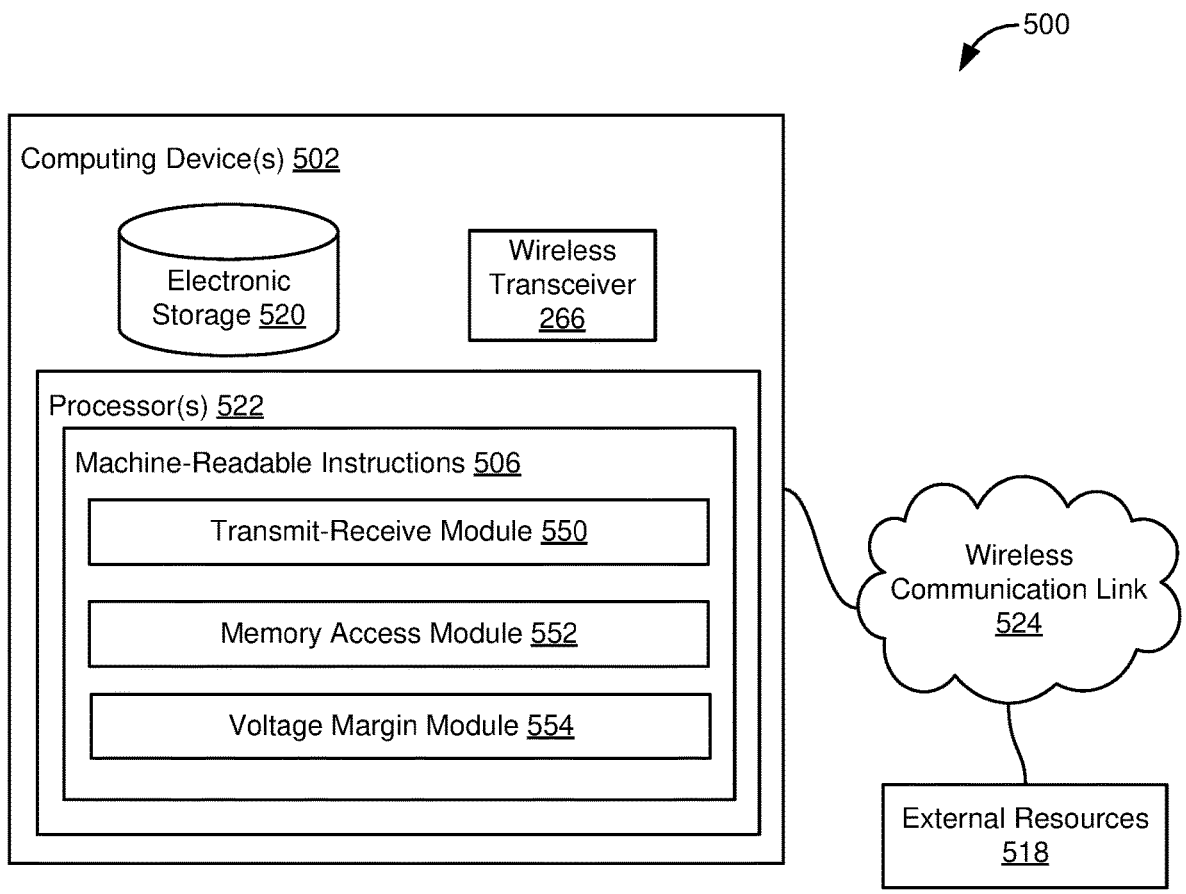
FIG. 5 is a component block diagram illustrating an example system for managing voltage droop margins of a PDN according to some embodiments.

FIG. 5 is a component block diagram illustrating an example system 500 for managing voltage droop margins of a PDN according to some embodiments. With reference to FIGS. 1-5, the system 500 may include one or more computing device(s) 502 (e.g., computing device 10) and external resources 518, which may communicate via a wireless communication link 524. External resources 518 may include sources of information outside of the system 500, external entities participating with the system 500, or other resources. For example, external resources 518 may be a paired BT device such as the second BT device 106. In some implementations, some or all of the functionality attributed herein to external resources 518 may be provided by resources included in the system 500. The system 500 may include a plurality of hardware, software, and/or firmware components operating together to provide the functionality attributed herein to the processor 522.

The computing device(s) 502 may include electronic storage 520 that may be configured to store information related to functions implemented by an interface module 530, a transmit-receive module 550, a memory access module 552, an voltage margin module 554, and any other instruction modules.

The electronic storage 320 may include non-transitory storage media that electronically stores information. The electronic storage 320 may include one or both of system storage that is provided integrally (i.e., substantially non-removable) with the system 200 and/or removable storage that is removably connectable to the system 200 via, for example, a port (e.g., a universal serial bus (USB) port, a firewire port, etc.) or a drive (e.g., a disk drive, etc.).

In various embodiments, electronic storage 520 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. The electronic storage 520 may include one or more virtual storage resources (e.g., cloud storage, a virtual private network, and/or other virtual storage resources). The electronic storage 520 may store software algorithms, information determined by processor(s) 522, and/or other information that enables the system 500 to function as described herein.

The computing device(s) 502 may be configured by machine-readable instructions 506. Machine-readable instructions 506 may include one or more instruction modules. The instruction modules may include computer program modules. The instruction modules may include one or more of the transmit-receive module 550, the memory access module 552, the voltage margin module 554, and other instruction modules (not illustrated). The computing device(s) 502 may include processor(s) 522 configured to implement the machine-readable instructions 506 and corresponding modules.

The processor(s) 522 may include one of more local processors that may be configured to provide information processing capabilities in the system 500. As such, the processor(s) 522 may include one or more of a digital processor, an analog processor, a digital circuit designed to process information, an analog circuit designed to process information, a state machine, and/or other mechanisms for electronically processing information. Although the processor(s) 522 is shown in FIG. 5 as a single entity, this is for illustrative purposes only. In some embodiments, the processor(s) 522 may include a plurality of processing units. These processing units may be physically located within the same device, or the processor(s) 522 may represent processing functionality of a plurality of devices distributed in the system 500.

In some embodiments, the processor(s) 522 executing the transmit-receive module 550 may be configured to receive, by a processor from a first client powered by a shared power rail within the PDN, a first requested performance corner. In some embodiments, the processor(s) 522 executing the transmit-receive module 550 may be configured to receive, by the processor from a second client powered by the shared power rail, a second requested performance corner.

In some embodiments, the processor(s) 522 executing the memory access module 552 may be configured to determine by the processor a first peak current value based on the first requested performance corner. In some embodiments, the processor(s) 522 executing the memory access module 552 may be configured to determine by the processor a second peak current value based on the second requested performance corner. In some embodiments, the processor(s) 522 executing the memory access module 552 may be configured to determine by the processor a first impedance value associated with the first requested performance corner, wherein the first impedance value is associated with a first operating frequency of the first requested performance corner. In some embodiments, the processor(s) 522 executing the memory access module 552 may be configured to determine by the processor a second impedance value associated with the second requested performance corner, wherein the second impedance value is associated with a second operating frequency of the second requested performance corner.

In some embodiments, the processor(s) 522 executing the voltage margin module 554 may be configured to determine by the processor a system voltage droop margin based on the first peak current value, the second peak current value, and an impedance value of the PDN. In some embodiments, the processor(s) 522 executing the voltage margin module 554 may be configured to adjust a voltage of the shared power rail based on the system voltage droop margin. In some embodiments, the processor(s) 522 executing the voltage margin module 554 may be configured to reduce the system voltage droop margin based on transient load current rise time of the PDN.

The processor(s) 522 may execute the modules 550-554 and/or other modules by software, hardware, firmware, some combination of software, hardware, and/or firmware, and/or other mechanisms for configuring processing capabilities on processor(s) 522.

The description of the functionality provided by the different modules 550-554 is for illustrative purposes, and is not intended to be limiting, as any of modules 550-554 may provide more or less functionality than is described. For example, one or more of modules 550-554 may be eliminated, and some or all of its functionality may be provided by other ones of modules 550-554. As another example, processor(s) 522 may execute one or more additional modules that may perform some or all of the functionality attributed below to one of modules 550-554.

FIG. 6 illustrates an example peak current value table for client voting schemes of a PDN. The number of clients (e.g., 202), the requested performance corners, and the current values are merely illustrative and are not meant to be exhaustive. Fewer or more clients may be implemented with a PDN (e.g., system 200), other operating modes may be implemented, and other current values may be utilized depending on the design of the PDN.

Referring to FIGS. 1-6, the peak current value table 600 illustrates clients 202 (Client 1, Client 2, Client 3), requested performance corners, and peak current values. The peak current value table 600 includes peak current values for use in determining conventional static PDN voltage margins (i.e., total voltage noise margin) and peak current values for use in determining minimized PDN voltage margins according to some embodiments.

Existing PDN voltage margins are static with the consideration that all the clients under a shared rail will result in concurrent a worst case di/dt transient response. As previously described, this may cause the power manager to overcompensate and supply more voltage to a shared power rail than necessary to ensure a voltage droop does not cause the voltage supplied to the clients to dip below a minimum required operating voltage of the client load. For example, Client 1, Client 2, and Client 3 may each request different performance corners from the power manager 28—Client 1 may request a turbo performance corner (i.e., a high voltage and/or high frequency performance corner), Client 2 may request a Static Voltage Scaling (SVS) performance corner (i.e., a performance corner with a lower operating voltage and/or frequency than the turbo performance corner), and Client 3 may request a Low SVS (LSVS) (i.e., a performance corner with a lower operating voltage and/or frequency than the SVS performance corner. Conventionally, a PMIC or power manager would aggregate the shared power rail performance corners to determine the highest level of operation requested by the clients. Here, the highest level of operation requested by the Client 1, Client 2, and Client 3 would be the high-frequency turbo mode. The worst case total di/dt would be the summation of each client's peak current during a turbo performance corner, despite two of the clients not requesting turbo mode (e.g., Client 1 turbo voltage and frequency=10 A; Client 2 turbo voltage and frequency=6 A; Client 3 turbo voltage and frequency=5 A; total di/dt at aggregated performance corner=21 A). The static PDN voltage margin would be set to be at least greater than a voltage droop for a 21 A worst case di/dt load attack on the shared power rail. However, the voltage margin calculated using the conventional aggregated performance methodology would supply more voltage to the clients than necessary, as the Client 2 and Client 3 in actuality only requested SVS and LSVS, which impart less voltage droop than turbo mode at transient responses.

Various embodiments minimize the static PDN voltage margins and reduce overcompensation of the voltage supplied by the power manager 28 to the shared power rail 201 by cumulating the peak current values corresponding to the actual performance corners (and not the aggregated performance corner) requested by each of the clients 202. For example, Client 1 may request a turbo performance corner, Client 2 may request an SVS performance corner, and Client 3 may request an LSVS performance corner to the power manager 28. The power manager 28 may be configured to determine a peak current associated with each requested performance corner. For example, the power manager 28, upon receiving one or more messages or signals from the clients 202 including a requested performance corner, may determine or otherwise request, from a lookup table, a predefined/designed peak current value associated with each requested performance corner. A cumulative peak current value di/dt (i.e., Ipeak load attack) may then be determined by aggregating the peak currents at each requested performance corner (e.g., Client 1 turbo voltage and frequency=10 A; Client 2 turbo voltage and SVS frequency=2 A; Client 3 turbo voltage and LSVS frequency=1 A; total di/dt at requested performance corners=13 A). The power manager 28 may calculate the voltage droop based on the known impedance of the PDN (i.e., Z(f)) and the cumulative peak current value 13 A. The power manager 28 may then safely reduce the static PDN voltage margins, and therefore the voltage floor at the power manager 28 (i.e., SYS Vmin @ PMIC), to reduce the overall power waste across the shared power rail 201 while maintaining sufficient voltage that ensures any potential voltage droop does not dip below the minimum required voltage (i.e., SYS Vmin @ junction) of the clients 202. In other words, the power manager 28 may estimate rail (uS) and on-die (nS) level peak current based on clients 202 performance vote requests and known PDN impedance specifications, and may calculate voltage droop margins to optimize voltage for any vote request configuration of the clients 202.

As another example calculation (not shown), the Client 1 may request an LSVS performance corner, the Client 2 may request an SVS performance corner, and the Client 3 may request an SVS performance corner. Thus, the cumulative peak current value for use in determining voltage droops may be calculated as follows: Client 1 SVS voltage and LSVS frequency=1 A; Client 2 SVS voltage and SVS frequency=2 A; Client 3 SVS voltage and SVS frequency=2 A; total di/dt at requested performance corners=5 A. The power manager 28 may then further reduce the PDN voltage margins and therefore the voltage supplied to the shared power rail 201.

In some embodiments, the power manager 28 may determine voltage droops across the PCB (i.e., V droop 1) and a package die (e.g., SoC 12) (i.e., V droop 2) based on peak current values associated with each performance corner requested by the clients 202.

For example, the customer PDN margin may be a static voltage droop margin that may be designed to account for voltage droop (e.g., V droop 1) for PMIC (e.g., power manager 28) and PCB capacitor (e.g., pcb_caps) transient responses. V droop 1 may be determined by multiplying known impedance Z(f) of the shared power rail 201 from the power manager 28 to the board-side components with the total di/dt at requested performance corners (e.g., 13 A, 5 A according to the aforementioned examples). The customer PDN margin may then be reduced based on the calculated Voltage droop 1 for cumulative peak current value at requested performance corners.

The PDN design budget margin may be a static voltage droop margin that may be designed to account for voltage droop (e.g., V droop 2) for package (e.g., SoC 12) capacitor (e.g., pkg_caps) transient responses, other package and on-die voltage drops, and package and die PDN noise margins. V droop 2 may be determined by multiplying known impedance Z(f) of the shared power rail 201 from the package-side components with the total di/dt at requested performance corners (e.g., 13 A, 5 A according to the aforementioned examples). The PDN design budget margin may then be reduced based on the calculated Voltage droop 2 for cumulative peak current value at requested performance corners.

Thus, the power manager 28 may reduce the customer PDN margin and the PDN design budget margin individually.

In some embodiments, a reduced total Vmin noise margin may be based on transient load rise time ($t_r$) of the PDN. Some embodiments may proactively manage transient load rise time and further reduce customer PDN margins (i.e., to account for Voltage droop 1) by being aware of managed di/dt load profiles. For example, based on prior data simulations, a worst-case on-die Ipeak (e.g., few ns of rise time) and worst-case on-board Ipeak (i.e., averaged over 1 us) may be determined. These worst-case values may be used in combination with the already known impedance data algorithm to determine a PDN voltage margin reduction with respect to V droop 1 & V droop 2.

Figure 7:
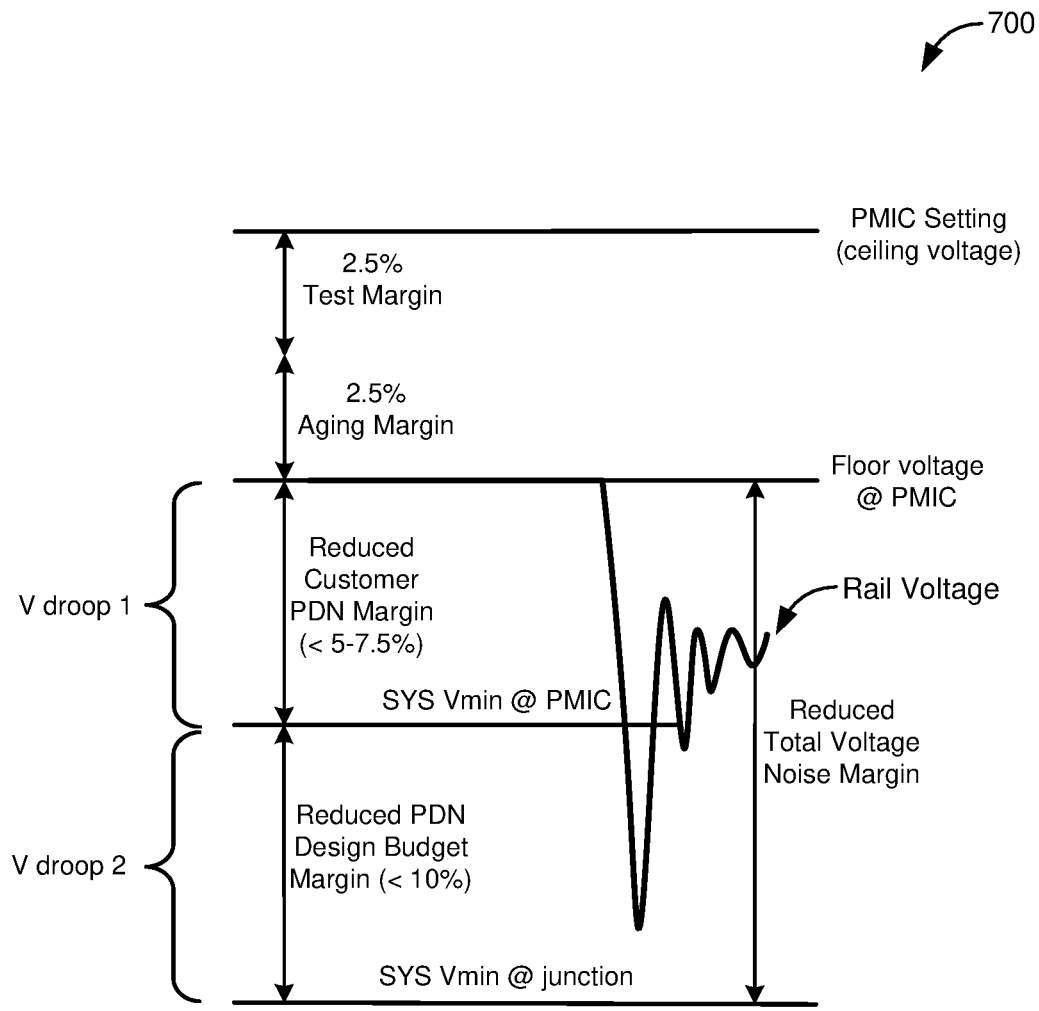
FIG. 7 illustrates a diagram including reduced voltage margins for a shared power rail within a PDN according to some embodiments.

FIG. 7 illustrates a diagram 700 illustrating reduced voltage margins for a shared power rail within a PDN according to some embodiments. The diagram 700 illustrates reduced voltage margins that are designed into the power output settings of a power manager 28 or PMIC (PMIC setting), such that the voltage level provided to loads at the endpoints of a shared power rail does not drop below a minimum system load requirement (i.e., SYS Vmin @ junction) as a result of voltage drooping due to transient responses of the components of the shared power rail 201. The reduced voltage margins illustrated are based on requested performance corners (i.e., and therefore cumulative peak current) of the clients 202 and not based on aggregated performance corners as illustrated in FIGS. 4 and 6 comparatively. The reduced voltage margins reduce total power usage of the system 200 by bringing the floor voltage as close to the SYS Vmin @ junction voltage as possible without the risk of having the Rail Voltage droop below the SYS Vmin @ junction value. For example, the reduced customer PDN margin as illustrated in FIG. 7 may be a margin that is less than the conventional customer PDN margin as illustrated in FIG. 4. For example, the reduced PDN design budget margin as illustrated in FIG. 7 may be a margin that is less than the conventional PDN design budget margin as illustrated in FIG. 4. Thus the reduced total voltage margin as illustrated in FIG. 7 may be a margin that is less than the conventional total voltage margin as illustrated in FIG. 4.

Figure 8A:
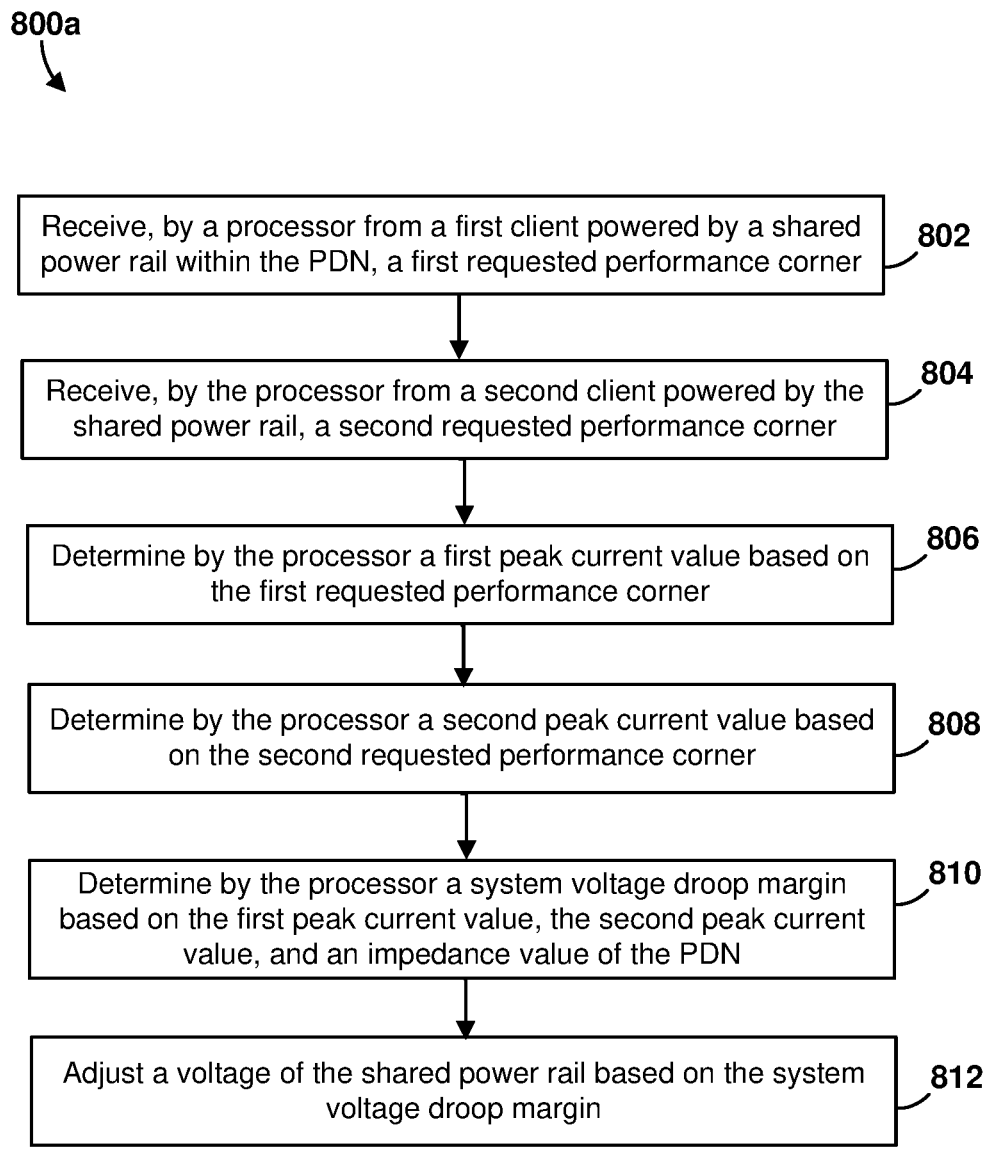
FIGS. 8A-8C are process flow diagrams illustrating methods for managing voltage droop margins of a PDN according to some embodiments.
Figure 8B:
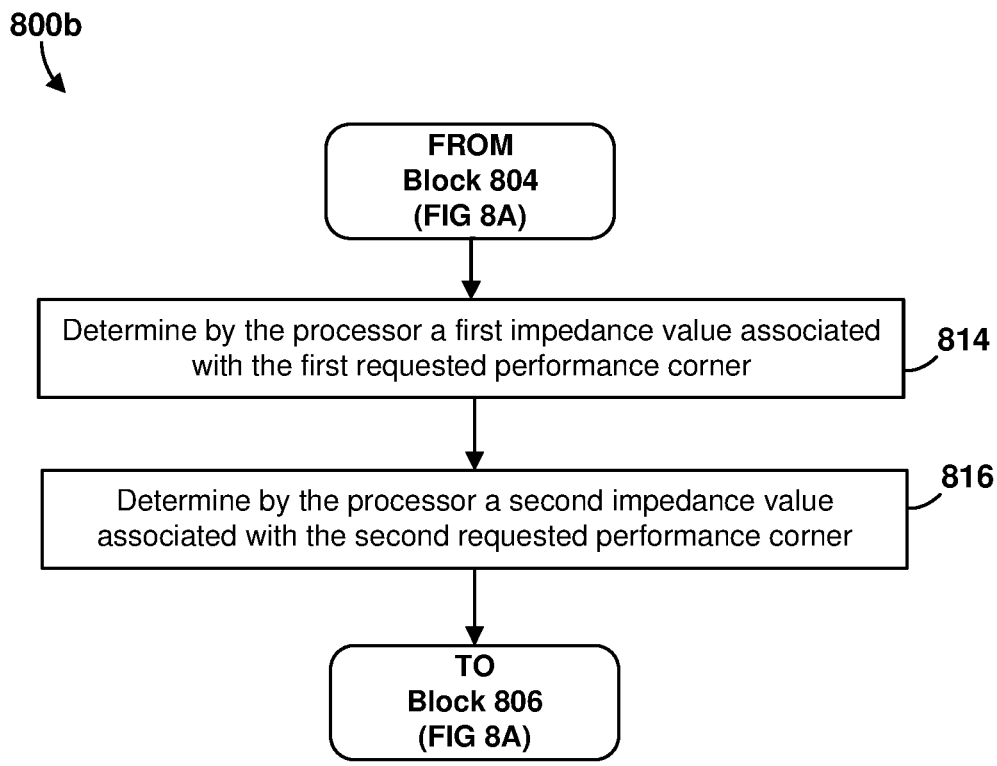
Figure 8C:
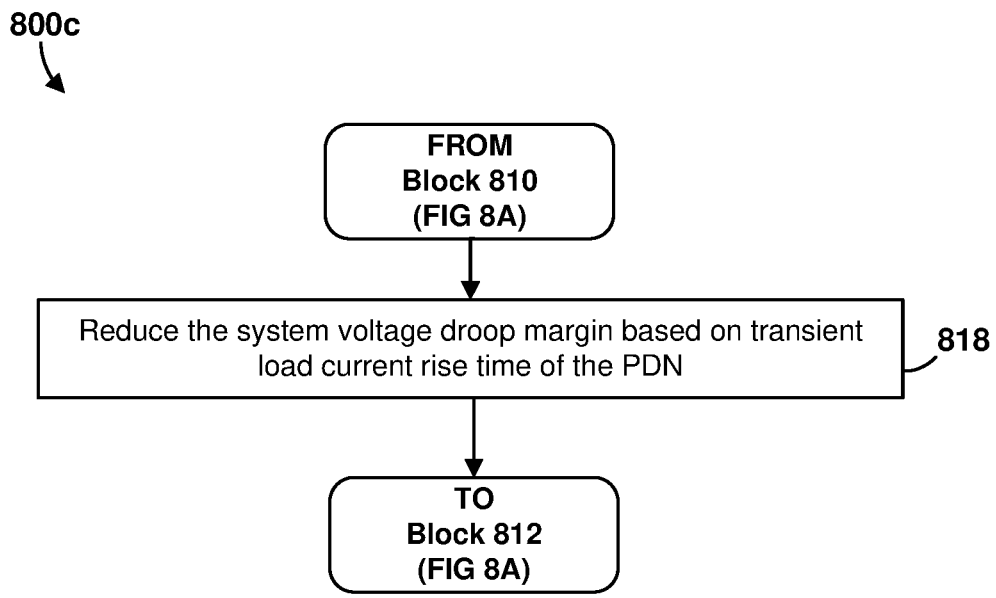

FIG. 8A is a process flow diagram of an example method 800*a* for managing voltage droop margins of a PDN in accordance with various embodiments. FIGS. 8B and 8C are process flow diagrams of example operations 800*b* and 800*c* that may be performed as part of the method 800*a* as described for managing voltage droop margins of a PDN in accordance with some embodiments. With reference to FIGS. 1-8C, the method 800*a* and the operations 800*b* and 800*c* may be performed by a computing device (e.g., 10, 502). In some embodiments, the computing device may be configured to perform the operations by processor-executable instructions stored in a non-transitory processor-readable medium (e.g., 16, 24, 36, 520). Means for performing each of the operations of the method 800*a* and the operations 800*b* and 800*c* may be a processor (e.g., 14, 522, power manager 28) of the systems 100, 200, and 500, and/or the like as described with reference to FIGS. 1-8C.

In block 802, the computing device may perform operations including receiving, by a processor from a first client (e.g., Client 1, Client 2, Client 3) powered by a shared power rail 201 within the PDN, a first requested performance corner (e.g., turbo, SVS, LSVS). In some embodiments, the first requested performance corner may be included as part of a first vote request received by the processor from the first client, in which the vote request includes a request to make a voltage adjustment to the shared power rail 201. Means for performing the operations of block 802 may include a computing device (e.g., 10, 502) executing the transmit-receive module 550.

In block 804, the computing device may perform operations including receiving, by the processor from a second client (e.g., Client 1, Client 2, Client 3) powered by the shared power rail 201, a second requested performance corner. In some embodiments, the second requested performance corner may be included as part of a second vote request received by the processor from the second client, in which the vote request includes a request to make a voltage adjustment to the shared power rail 201. In some embodiments, the first requested performance corner and the second requested performance corner may be one of a high frequency mode (e.g., turbo mode), a low frequency mode (SVS), or a lowest frequency mode (LSVS). Means for performing the operations of block 804 may include a computing device (e.g., 10, 502) executing the transmit-receive module 550.

In block 806, the computing device may perform operations including determining by the processor a first peak current value based on the first requested performance corner. In some embodiments, determining by the processor the first peak current value based on the first requested performance corner may include the processor identifying the first peak current value associated with the first requested performance corner in a lookup table. Means for performing the operations of block 806 may include a computing device (e.g., 10, 502) executing the memory access module 552.

In block 808, the computing device may perform operations including determining by the processor a second peak current value based on the second requested performance corner. In some embodiments, determining by the processor the second peak current value based on the second requested performance corner may include the processor identifying the second peak current value associated with the second requested performance corner in the lookup table. Means for performing the operations of block 806 may include a computing device (e.g., 10, 502) executing the memory access module 552.

In block 810, the computing device may perform operations including determining by the processor a system voltage droop margin (e.g., reduced total Vmin noise margin) based on the first peak current value, the second peak current value, and an impedance value (e.g., Z(f)) of the PDN. In some embodiments, determining by the processor the voltage droop margin based on the first peak current value, the second peak current value, and the impedance value of the PDN may include aggregating the first peak current value and the second peak current value to determine by the processor a cumulative peak current value (i.e., total di/dt at requested performance corners=Client 1 di/dt+Client 2 di/dt), and determining by the processor the voltage droop margin based on the cumulative peak current value and the impedance value of the PDN (i.e., total di/dt at requested performance corners*Z(f)). In some embodiments, the impedance value of the PDN may be based on a highest operating frequency that is equal to a higher of a first operating frequency of the first requested performance corner and a second operating frequency of the second requested performance corner. For example, a client requesting a performance corner of turbo and a client requesting a performance corner of SVS would have a V droop calculated using Z(f) of the turbo mode, instead of Z(f) of the lower frequency SVS mode. Means for performing the operations of block 810 may include a computing device (e.g., 10, 502) executing the voltage margin module 554.

In block 812, the computing device may perform operations including adjusting a voltage of the shared power rail based on the system voltage droop margin. Means for performing the operations of block 812 may include a computing device (e.g., 10, 502) executing the voltage margin module 554.

FIG. 8B illustrates operation 800*b* that may be performed as part of the method 800*a* for managing voltage droop margins of a PDN in accordance with some embodiments. With reference to FIGS. 1-8B, following the operations in block 804, the computing device may perform operations including determining by the processor a first impedance value associated with the first requested performance corner, in which the first impedance value is associated with a first operating frequency of the first requested performance corner in block 812. Means for performing the operations of block 812 may include a computing device (e.g., 10, 502) executing the memory access module 552.

In block 816, the computing device may perform operations including determining by the processor a second impedance value associated with the second requested performance corner, in which the second impedance value is associated with a second operating frequency of the second requested performance corner. Means for performing the operations of block 812 may include a computing device (e.g., 10, 502) executing the memory access module 552.

Following the operations in block 816, the computing device may perform operations as described with reference to block 806. In some embodiments, following the operations in block 816, the operations in block 810 for determining by the processor the system voltage droop margin based on the first peak current value, the second peak current value, and an impedance value of the PDN may include, determining by the processor a first voltage droop margin based on the first peak current value and the first impedance value, determining by the processor a second voltage droop margin based on the second peak current value and the second impedance value, aggregating the first voltage droop margin and the second voltage droop margin to determine by the processor the system voltage droop margin.

Each requested performance corner (e.g., turbo, SVS, LSVS) may result in different impedance values Z(f) throughout the shared power rail 201 (see FIG. 3A). For example, the impedance of the shared power rail 201 with clients 202 operating at turbo performance corners may be a different value than when clients 202 are operating at SVS or LSVS performance corners. In some embodiments, V droop may be calculated individually for each client and for each operating frequency of the requested performance corners. For example, a client requesting a performance corner of turbo would have a V droop calculated using Z(f) of the turbo mode, and a client requesting a performance corner of LSVS would have a V droop calculated using Z(f) of the LSVS mode, instead of Z(f) of the higher frequency SVS mode (e.g., reduced total Vmin noise margin=V droop 1 margin+V droop 2 margin=(client 1 Ipeak*PDN Z high freq)+(client 2 Ipeak*PDN Z lower freq)).

In some embodiments, the operations of blocks 814 and 816 may be performed between operations in blocks 806 and 808.

FIG. 8C illustrates operation 800*c* that may be performed as part of the method 800*a* for managing voltage droop margins of a PDN in accordance with some embodiments. With reference to FIGS. 1-8C, following the operations in block 810, the computing device may perform operations including reducing the system voltage droop margin based on transient load current rise time of the PDN in block 818. Means for performing the operations of block 812 may include a computing device (e.g., 10, 502) executing the voltage margin module 554.

Following the operations in block 818, the computing device may perform operations as described with reference to block 812.

Figure 9:
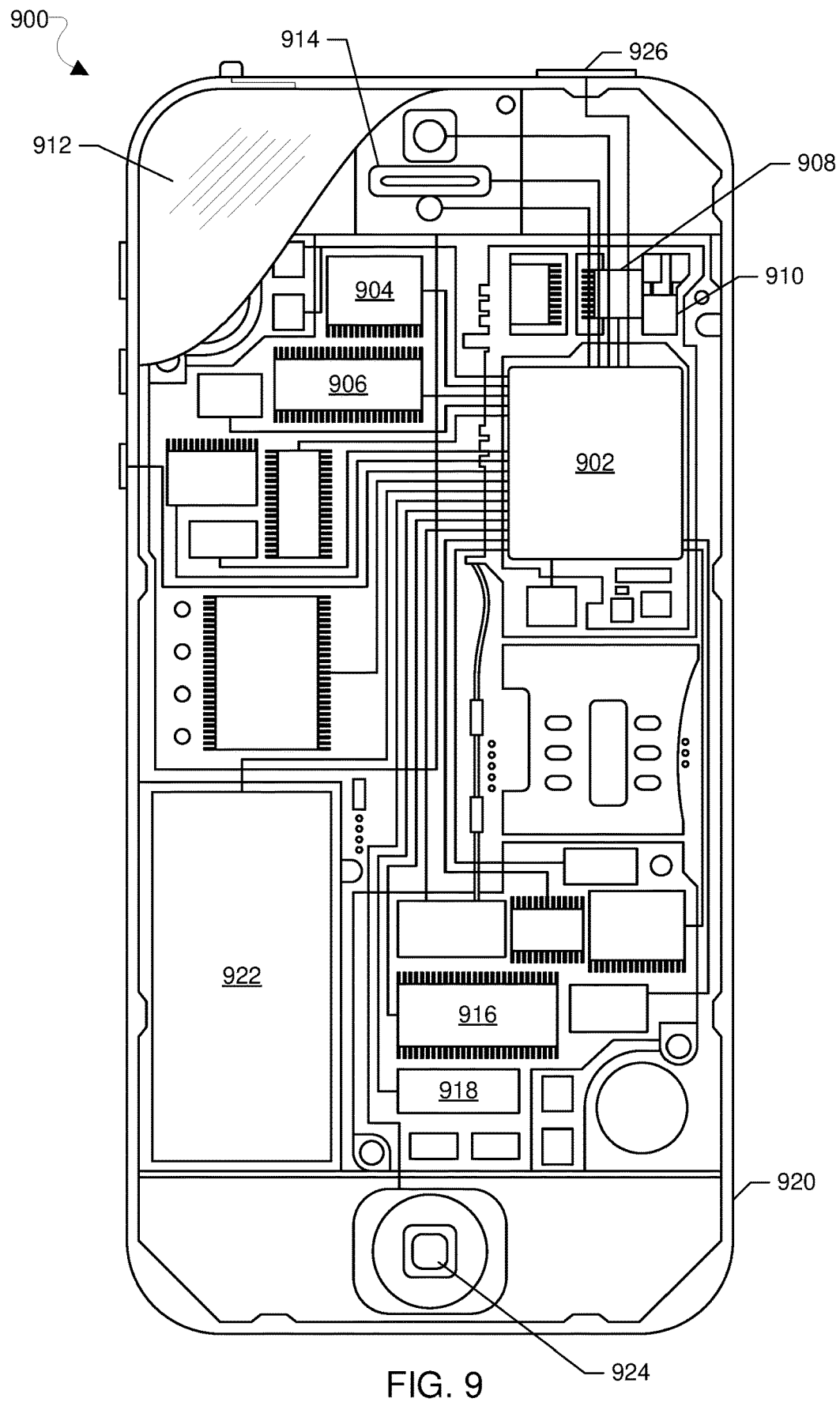
FIG. 9 is a component block diagram illustrating an example mobile computing device suitable for implementing various embodiments.

Various embodiments (including, but not limited to, embodiments described above with reference to FIGS. 1-8C) may be implemented in a wide variety of computing systems including mobile computing devices, an example of which is illustrated in FIG. 9. A mobile computing device 900 may include a processor 902 coupled to a touchscreen controller 904 and an internal memory 906. The processor 902 may be one or more multicore integrated circuits designated for general or specific processing tasks. The internal memory 906 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the mobile computing device 900 need not have touch screen capability.

The mobile computing device 900 may have one or more radio signal transceivers 908 (e.g., Peanut, Bluetooth, Zig-Bee, Wi-Fi, RF radio) and antennae 910, for sending and receiving communications, coupled to each other and/or to the processor 902. The transceivers 908 and antennae 910 may be used with the above-mentioned circuitry to implement the various wireless transmission protocol stacks and interfaces. The mobile computing device 900 may include a cellular network wireless modem chip 916 that enables communication via a cellular network and is coupled to the processor.

The mobile computing device 900 may include a peripheral device connection interface 918 coupled to the processor 902. The peripheral device connection interface 918 may be singularly configured to accept one type of connection, or may be configured to accept various types of physical and communication connections, common or proprietary, such as Universal Serial Bus (USB), FireWire, Thunderbolt, or PCIe. The peripheral device connection interface 918 may also be coupled to a similarly configured peripheral device connection port (not shown).

The mobile computing device 900 may also include speakers 914 for providing audio outputs. The mobile computing device 900 may also include a housing 920, which may be constructed of a plastic, metal, or a combination of materials, for containing all or some of the components described herein. The mobile computing device 900 may include a power source 922 coupled to the processor 902, such as a disposable or rechargeable battery. The rechargeable battery may also be coupled to the peripheral device connection port to receive a charging current from a source external to the mobile computing device 900. The mobile computing device 900 may also include a physical button 924 for receiving user inputs. The mobile computing device 900 may also include a power button 926 for turning the mobile computing device 900 on and off.

Figure 10:
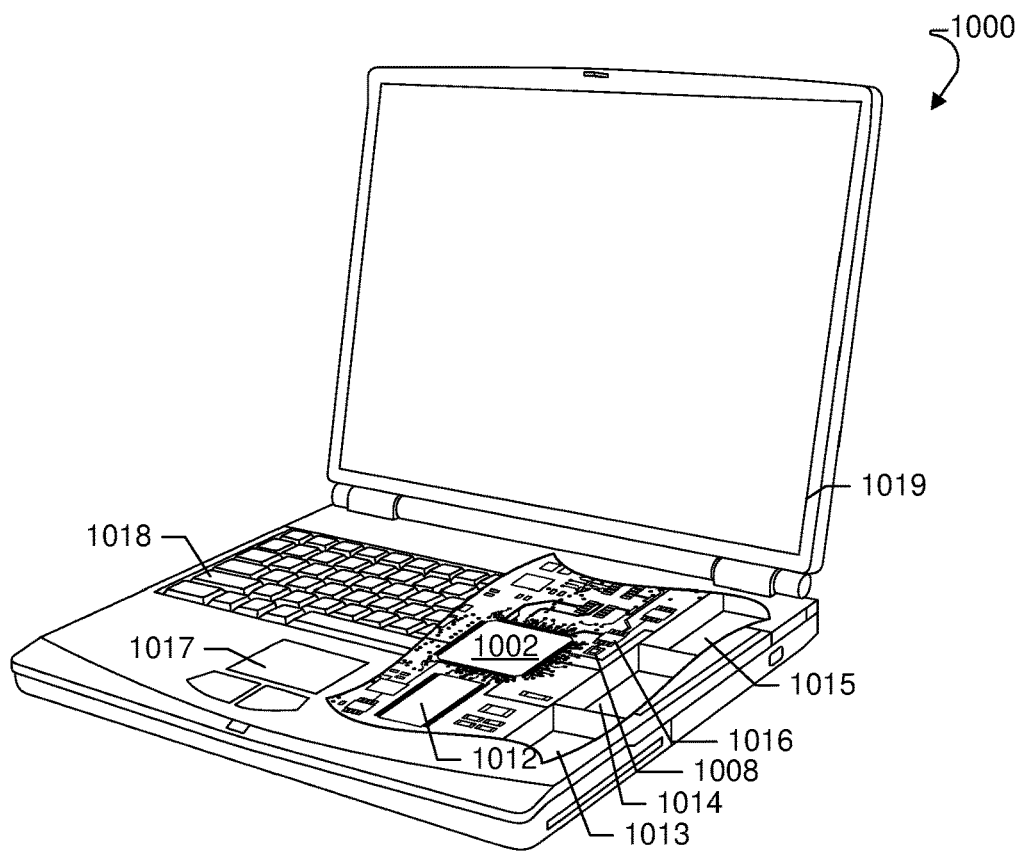
FIG. 10 is a component block diagram illustrating an example mobile computing device suitable for implementing various embodiments.

The various embodiments (including, but not limited to, embodiments described above with reference to FIGS. 1-8C) may be implemented in a wide variety of computing systems, including a laptop computer 1000 an example of which is illustrated in FIG. 10. Many laptop computers include a touchpad touch surface 1017 that serves as the computer's pointing device, and thus may receive drag, scroll, and flick gestures similar to those implemented on computing devices equipped with a touch screen display and described above. A laptop computer 1000 will typically include a processor 1002 coupled to volatile memory 1012 and a large capacity nonvolatile memory, such as a disk drive 1013 of Flash memory. Additionally, the computer 1000 may have one or more antenna 1008 for sending and receiving electromagnetic radiation that may be connected to a wireless data link and/or cellular telephone transceiver 1016 coupled to the processor 1002. The computer 1000 may also include a floppy disc drive 1014 and a compact disc (CD) drive 1015 coupled to the processor 1002. In a notebook configuration, the computer housing includes the touchpad 1017, the keyboard 1018, and the display 1019 all coupled to the processor 1002. Other configurations of the computing device may include a computer mouse or trackball coupled to the processor (e.g., via a USB input) as are well known, which may also be used in conjunction with the various embodiments.

Figure 11:
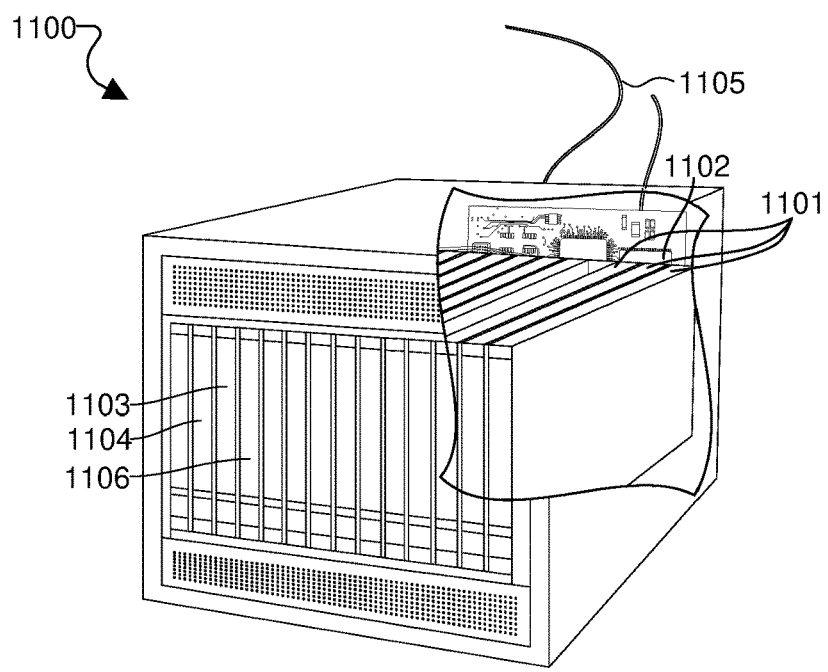
FIG. 11 is a component block diagram illustrating an example server suitable for implementing various embodiments.

The various embodiments (including, but not limited to, embodiments described above with reference to FIGS. 1-8C) may also be implemented in fixed computing systems, such as any of a variety of commercially available servers. An example server 1100 is illustrated in FIG. 11. Such a server 1100 typically includes one or more multicore processor assemblies 1101 coupled to volatile memory 1102 and a large capacity nonvolatile memory, such as a disk drive 1104. As illustrated in FIG. 11, multicore processor assemblies 1101 may be added to the server 1100 by inserting them into the racks of the assembly. The server 1100 may also include a floppy disc drive, compact disc (CD) or digital versatile disc (DVD) disc drive 1106 coupled to the processor 1101. The server 1100 may also include network access ports 1103 coupled to the multicore processor assemblies 1101 for establishing network interface connections with a network 1105, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

Computer program code or "program code" for execution on a programmable processor for carrying out operations of the various embodiments may be written in a high-level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Implementation examples are described in the following paragraphs. While some of the following implementation examples are described in terms of an example computing device memory system, further example implementations may include: the example functions of the computing device memory system discussed in the following paragraphs implemented as methods of the following implementation examples; and the example computing device memory system discussed in the following paragraphs implemented by a computing device memory system including means for performing functions of the computing device memory system of the following implementation examples.

Example 1. A method for managing a power distribution network (PDN), including: determining by a processor a first peak current value based on a first requested performance corner received from a first client powered by a shared power rail within the PDN; determining by the processor a second peak current value based on a second requested performance corner received from a second client powered by the shared power rail within the PDN; determining by the processor a system voltage droop margin based on the first peak current value, the second peak current value, and an impedance value of the PDN; and adjusting a voltage of the shared power rail based on the system voltage droop margin.

Example 2. The method of example 1, in which: determining by the processor the first peak current value based on the first requested performance corner includes the processor identifying the first peak current value associated with the first requested performance corner in a lookup table, and determining by the processor the second peak current value based on the second requested performance corner includes the processor identifying the second peak current value associated with the second requested performance corner in the lookup table.

Example 3. The method of any of examples 1-2, in which determining by the processor the system voltage droop margin based on the first peak current value, the second peak current value, and the impedance value of the PDN includes: aggregating the first peak current value and the second peak current value to determine by the processor a cumulative peak current value; and determining by the processor the system voltage droop margin based on the cumulative peak current value and the impedance value of the PDN.

Example 4. The method of any of examples 1-3, in which the impedance value of the PDN is based on a highest operating frequency that is equal to a higher of a first operating frequency of the first requested performance corner and a second operating frequency of the second requested performance corner.

Example 5. The method of any of examples 1-4, further including: determining by the processor a first impedance value associated with the first requested performance corner, in which the first impedance value is associated with a first operating frequency of the first requested performance corner; and determining by the processor a second impedance value associated with the second requested performance corner, in which the second impedance value is associated with a second operating frequency of the second requested performance corner.

Example 6. The method of example 5, in which determining by the processor the system voltage droop margin based on the first peak current value, the second peak current value, and the impedance value of the PDN includes: determining by the processor a first voltage droop margin based on the first peak current value and the first impedance value; determining by the processor a second voltage droop margin based on the second peak current value and the second impedance value; and aggregating the first voltage droop margin and the second voltage droop margin to determine by the processor the system voltage droop margin.

Example 7. The method of any of examples 1-6, further including: reducing the system voltage droop margin based on transient load current rise time of the PDN.

Example 8. The method of any of examples 1-7, in which: the first requested performance corner is included as part of a first vote request received by the processor from the first client, and the second requested performance corner is included as part of a second vote request received by the processor from the second client.

Example 9. The method of any of examples 1-8, in which the first requested performance corner and the second requested performance corner are one of a high frequency mode, a low frequency mode, or a lowest frequency mode.

Example 10. The method of any of examples 1-9, further comprising: receiving, by a processor from a first client powered by a shared power rail within the PDN, a first requested performance corner; and receiving, by the processor from a second client powered by the shared power rail, a second requested performance corner.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for managing a power distribution network (PDN), comprising:
determining by a processor a first peak current value based on a first requested performance corner received from a first client powered by a shared power rail within the PDN;

determining by the processor a second peak current value based on a second requested performance corner received from a second client powered by the shared power rail;

determining by the processor a system voltage droop margin based on the first peak current value, the second peak current value, and an impedance value of the PDN;

adjusting a voltage of the shared power rail based on the system voltage droop margin;

determining by the processor a first impedance value associated with the first requested performance corner, wherein the first impedance value is associated with a first operating frequency of the first requested performance corner; and determining by the processor a second impedance value associated with the second requested performance corner, wherein the second impedance value is associated with a second operating frequency of the second requested performance corner.

2. The method of claim 1, wherein:

determining by the processor the first peak current value based on the first requested performance corner comprises the processor identifying the first peak current value associated with the first requested performance corner in a lookup table, and determining by the processor the second peak current value based on the second requested performance corner comprises the processor identifying the second peak current value associated with the second requested performance corner in the lookup table.

3. The method of claim 1, wherein determining by the processor the system voltage droop margin based on the first peak current value, the second peak current value, and the impedance value of the PDN comprises:

aggregating the first peak current value and the second peak current value to determine by the processor a cumulative peak current value; and determining by the processor the system voltage droop margin based on the cumulative peak current value and the impedance value of the PDN.

4. The method of claim 1, wherein the impedance value of the PDN is based on a highest operating frequency that is equal to a higher of a first operating frequency of the first requested performance corner and a second operating frequency of the second requested performance corner.

5. The method of claim 1, wherein determining by the processor the system voltage droop margin based on the first peak current value, the second peak current value, and the impedance value of the PDN comprises:

determining by the processor a first voltage droop margin based on the first peak current value and the first impedance value;

determining by the processor a second voltage droop margin based on the second peak current value and the second impedance value; and aggregating the first voltage droop margin and the second voltage droop margin to determine by the processor the system voltage droop margin.

6. The method of claim 1, further comprising:

reducing the system voltage droop margin based on transient load current rise time of the PDN.

7. The method of claim 1, wherein:

the first requested performance corner is included as part of a first vote request received by the processor from the first client, and the second requested performance corner is included as part of a second vote request received by the processor from the second client.

8. The method of claim 1, wherein the first requested performance corner and the second requested performance corner are one of a high frequency mode, a low frequency mode, or a lowest frequency mode.

9. A computing device, comprising:

a shared power rail within a power distribution network (PDN); and a processor configured to:

determine a first peak current value based on a first requested performance corner received from a first client powered by the shared power rail;

determine a second peak current value based on a second requested performance corner from a second client powered by the shared power rail;

determine a system voltage droop margin based on the first peak current value, the second peak current value, and an impedance value of the PDN;

adjust a voltage of the shared power rail based on the system voltage droop margin;

determine a first impedance value associated with the first requested performance corner, wherein the first impedance value is associated with a first operating frequency of the first requested performance corner; and determine a second impedance value associated with the second requested performance corner, wherein the second impedance value is associated with a second operating frequency of the second requested performance corner.

10. The computing device of claim 9, wherein the processor is further configured to:

determine the first peak current value based on the first requested performance corner by identifying the first peak current value associated with the first requested performance corner in a lookup table, and determine the second peak current value based on the second requested performance corner by identifying the second peak current value associated with the second requested performance corner in the lookup table.

11. The computing device of claim 9, wherein the processor is further configured to determine the system voltage droop margin based on the first peak current value, the second peak current value, and the impedance value of the PDN by:

aggregating the first peak current value and the second peak current value to determine a cumulative peak current value; and determining the system voltage droop margin based on the cumulative peak current value and the impedance value of the PDN.

12. The computing device of claim 9, wherein the impedance value of the PDN is based on a highest operating frequency that is equal to a higher of a first operating frequency of the first requested performance corner and a second operating frequency of the second requested performance corner.

13. The computing device of claim 9, wherein the processor is further configured to determine the system voltage droop margin based on the first peak current value, the second peak current value, and the impedance value of the PDN by:

determining a first voltage droop margin based on the first peak current value and the first impedance value;

determining a second voltage droop margin based on the second peak current value and the second impedance value; and aggregating the first voltage droop margin and the second voltage droop margin to determine the system voltage droop margin.

14. The computing device of claim 9, wherein the processor is further configured to:
reduce the system voltage droop margin based on transient load current rise time of the PDN.

15. The computing device of claim 9, wherein:
the first requested performance corner is included as part of a first vote request received by the processor from the first client, and
the second requested performance corner is included as part of a second vote request received by the processor from the second client.

16. The computing device of claim 9, wherein the first requested performance corner and the second requested performance corner are one of a high frequency mode, a low frequency mode, or a lowest frequency mode.

17. A computing device, comprising:
a shared power rail within a power distribution network (PDN);
means for determining a first peak current value based on the first requested performance corner received from a first client powered by the shared power rail;
means for determining a second peak current value based on the second requested performance corner received from a second client powered by the shared power rail;
means for determining a system voltage droop margin based on the first peak current value, the second peak current value, and an impedance value of the PDN;
means for adjusting a voltage of the shared power rail based on the system voltage droop margin;
means for determining by the processor a first impedance value associated with the first requested performance corner, wherein the first impedance value is associated with a first operating frequency of the first requested performance corner; and
means for determining by the processor a second impedance value associated with the second requested performance corner, wherein the second impedance value is associated with a second operating frequency of the second requested performance corner.

18. The computing device of claim 17, wherein:
means for determining the first peak current value based on the first requested performance corner comprises means for identifying the first peak current value associated with the first requested performance corner in a lookup table, and
means for determining the second peak current value based on the second requested performance corner comprises means for identifying the second peak current value associated with the second requested performance corner in the lookup table.

19. The computing device of claim 17, wherein means for determining the system voltage droop margin based on the first peak current value, the second peak current value, and the impedance value of the PDN comprises:
means for aggregating the first peak current value and the second peak current value to determine a cumulative peak current value; and
means for determining the system voltage droop margin based on the cumulative peak current value and the impedance value of the PDN.

20. A non-transitory processor-readable medium having stored thereon processor-executable instructions configured to cause a processor of a computing device to perform operations comprising:
determining a first peak current value based on a first requested performance corner received from a first client powered by a shared power rail;
determining a second peak current value based on a second requested performance corner received from a second client powered by the shared power rail;
determining a system voltage droop margin based on the first peak current value, the second peak current value, and an impedance value of the PDN;
adjusting a voltage of the shared power rail based on the system voltage droop margin;
determining a first impedance value associated with the first requested performance corner, wherein the first impedance value is associated with a first operating frequency of the first requested performance corner; and
determining a second impedance value associated with the second requested performance corner, wherein the second impedance value is associated with a second operating frequency of the second requested performance corner.

21. The non-transitory processor-readable medium of claim 20, wherein the stored processor-executable instructions are configured to cause the processor to perform operations such that:
determining the first peak current value based on the first requested performance corner comprises identifying the first peak current value associated with the first requested performance corner in a lookup table, and
determining the second peak current value based on the second requested performance corner comprises identifying the second peak current value associated with the second requested performance corner in the lookup table.

22. The non-transitory processor-readable medium of claim 20, wherein the stored processor-executable instructions are configured to cause the processor to perform operations such that determining the system voltage droop margin based on the first peak current value, the second peak current value, and the impedance value of the PDN comprises:
aggregating the first peak current value and the second peak current value to determine a cumulative peak current value; and
determining the system voltage droop margin based on the cumulative peak current value and the impedance value of the PDN.

23. The non-transitory processor-readable medium of claim 20, wherein the impedance value of the PDN is based on a highest operating frequency that is equal to a higher of a first operating frequency of the first requested performance corner and a second operating frequency of the second requested performance corner.

24. The non-transitory processor-readable medium of claim 20, wherein the stored processor-executable instructions are configured to cause the processor to perform operations such that determining the system voltage droop margin based on the first peak current value, the second peak current value, and the impedance value of the PDN comprises:
determining a first voltage droop margin based on the first peak current value and the first impedance value;

determining a second voltage droop margin based on the second peak current value and the second impedance value; and aggregating the first voltage droop margin and the second voltage droop margin to determine the system voltage droop margin.

25. The non-transitory processor-readable medium of claim 20, wherein the stored processor-executable instructions are configured to cause the processor to perform operations further comprising:

reducing the system voltage droop margin based on transient load current rise time of the PDN.

26. The non-transitory processor-readable medium of claim 20, wherein:

the first requested performance corner is included as part of a first vote request received by the processor from the first client, and the second requested performance corner is included as part of a second vote request received by the processor from the second client.

27. The non-transitory processor-readable medium of claim 20, wherein the first requested performance corner and the second requested performance corner are one of a high frequency mode, a low frequency mode, or a lowest frequency mode.

* * * * *